US007912994B2

(12) United States Patent
Cornwell et al.

(10) Patent No.: US 7,912,994 B2
(45) Date of Patent: Mar. 22, 2011

(54) REDUCING CONNECTION TIME FOR MASS STORAGE CLASS PERIPHERAL BY INTERNALLY PREFETCHING FILE DATA INTO LOCAL CACHE IN RESPONSE TO CONNECTION TO HOST

(75) Inventors: Michael J. Cornwell, San Jose, CA (US); Christopher P. Dudte, San Jose, CA (US)

(73) Assignee: Apple Inc., Cupertino, CA (US)

( * ) Notice: Subject to any disclaimer, the term of this patent is extended or adjusted under 35 U.S.C. 154(b) by 983 days.

(21) Appl. No.: 11/342,126

(22) Filed: Jan. 27, 2006

(65) Prior Publication Data
US 2007/0180153 A1 Aug. 2, 2007

(51) Int. Cl.
*G06F 3/00* (2006.01)
*G06F 13/00* (2006.01)

(52) U.S. Cl. ............ 710/14; 710/8; 710/9; 710/10; 710/13; 710/74; 710/310; 711/103; 711/137; 709/217; 709/224; 345/745

(58) Field of Classification Search ............ 710/1, 8–10, 710/14, 38, 74, 310, 13; 713/1, 2; 709/217, 709/224; 711/137, 103, 127; 345/745
See application file for complete search history.

(56) References Cited

U.S. PATENT DOCUMENTS

| 5,602,987 | A | 2/1997 | Harari |
| 5,671,229 | A | 9/1997 | Harari |
| 5,719,808 | A | 2/1998 | Harari |
| 6,149,316 | A | 11/2000 | Harari |
| 6,404,707 | B1 | 6/2002 | Kaneda et al. |
| 6,405,362 | B1 * | 6/2002 | Shih et al. ............ 717/174 |
| 6,426,893 | B1 | 7/2002 | Conley |
| 6,721,820 | B2 | 4/2004 | Zilberman |
| 6,757,842 | B2 | 6/2004 | Harari |
| 6,763,424 | B2 | 7/2004 | Conley |
| 6,799,226 | B1 | 9/2004 | Robbin et al. |
| 6,914,846 | B2 | 7/2005 | Harari |
| 6,947,332 | B2 | 9/2005 | Wallace |
| 7,133,938 | B2 * | 11/2006 | Nagao ............ 710/10 |
| 7,137,011 | B1 | 11/2006 | Harari |
| 7,162,569 | B2 | 1/2007 | Conley |
| 7,222,240 | B2 * | 5/2007 | Elteto ............ 713/185 |
| 7,225,448 | B2 * | 5/2007 | Himmel et al. ............ 719/318 |
| 7,231,484 | B2 * | 6/2007 | Berenyi et al. ............ 710/308 |
| 7,237,046 | B2 | 6/2007 | Paley et al. |
| 7,237,074 | B2 | 6/2007 | Guterman |

(Continued)

OTHER PUBLICATIONS

WUSBS, Wireless Universal Serial Bus Specification, WUSBS, 2005, pp. 1, 17, 19, 29, 78-79, 120.*

*Primary Examiner* — Tammara Peyton
(74) *Attorney, Agent, or Firm* — Fish & Richardson P.C.

(57) ABSTRACT

Techniques for reducing mount time for a peripheral device connected to an external host device are presented. In some implementations, when a connection is detected, file system data is pre-fetched before a request for such data is sent by the external host device. This allows faster access to the file system data used for initiating read/write communications. In other implementations, in response to a data access command from the external host device, a reply message is delayed from the peripheral device to prevent data access command failures. This delayed response prevents the external host device from pausing before attempting subsequent communication requests.

34 Claims, 4 Drawing Sheets

U.S. PATENT DOCUMENTS

| | | | |
|---|---|---|---|
| 7,239,877 B2* | 7/2007 | Corneille et al. | 455/456.3 |
| 7,240,219 B2 | 7/2007 | Teicher et al. | |
| 7,334,144 B1* | 2/2008 | Schlumberger | 713/320 |
| 7,555,568 B2* | 6/2009 | Huang | 710/4 |
| 2002/0135613 A1* | 9/2002 | O'Hara | 345/745 |
| 2003/0179720 A1* | 9/2003 | Cuny | 370/310 |
| 2003/0187654 A1* | 10/2003 | Hoshino | 704/270 |
| 2004/0148470 A1* | 7/2004 | Schulz | 711/137 |
| 2004/0205298 A1* | 10/2004 | Bearden et al. | 711/137 |
| 2004/0260786 A1* | 12/2004 | Barile | 709/217 |
| 2005/0021880 A1 | 1/2005 | Robbin et al. | |
| 2005/0066028 A1* | 3/2005 | Illikkal et al. | 709/224 |
| 2005/0182886 A1* | 8/2005 | Edirisooriya et al. | 710/310 |
| 2005/0204091 A1* | 9/2005 | Kilbuck et al. | 711/103 |
| 2006/0047914 A1* | 3/2006 | Hofmann et al. | 711/137 |
| 2006/0095679 A1* | 5/2006 | Edirisooriya | 711/137 |
| 2006/0174228 A1* | 8/2006 | Radhakrishnan et al. | 717/127 |
| 2008/0147964 A1* | 6/2008 | Chow et al. | 711/103 |

* cited by examiner

REDUCING CONNECTION TIME FOR MASS STORAGE CLASS PERIPHERAL BY INTERNALLY PREFETCHING FILE DATA INTO LOCAL CACHE IN RESPONSE TO CONNECTION TO HOST

BACKGROUND

The present disclosure relates to peripheral disk drive devices, logical disk drives, mass storage class devices, and techniques for connecting to an external host device.

In typical operation, a peripheral device such as a peripheral disk drive, a logical disk drive, a mass storage class device, or another removable or portable storage device is periodically connected to an external host (i.e., by plugging into a desktop or laptop computer using a USB cable or a FireWire cable) to transfer data between the peripheral device and the external host device. The time required to establish communications is called a "mount time," and the time required to end the communications is called a "dismount time." To ensure proper continuing operation of the peripheral device, proper mount and dismount procedures should be observed. For example, removing the physical connection (USB or FireWire cable) between the external host device and the peripheral device before completing the dismount procedure can lead to data loss or corruption of data.

The time it takes to mount or dismount the peripheral device from the external host device can be irritatingly long for many users. Particularly, a mass storage class device such as a handheld, portable music player device requires time to switch from a playback mode of operation into a storage mode of operation. For example, an MP3 player may have a logical storage device (flash memory) or a disk drive device for storing music files. The flash memory typically has a "virtual" spin-up time, and the disk drive has a "physical" disk spin-up time for accessing stored files. When the MP3 player is connected to the external host device, the MP3 player switches from a mode for playing music files into a mode for reading/writing to and from the storage device (flash memory or disk drive). Among other things, the time needed to switch between the two modes includes spin-up time of the storage device. Conversely, when the MP3 player is disconnected from the external host device, the MP3 player switches from the mode for reading/writing to and from the storage device into the mode for playing music files, which includes time to stop and clear the storage device.

SUMMARY

Techniques for reducing connection time for mass storage devices are described.

In one aspect, communications involving a peripheral device is established by detecting a connection between the peripheral device and a host device and retrieving file system data from a storage media accessible by the peripheral device into a memory of the peripheral device in response to the detected connection. The file system data is retrieved prior to receiving a request for the file system data from the host device.

In another aspect, communications involving a peripheral device is established by detecting a connection between a peripheral device and a host device, receiving a data access message from the host device in response to establishing the connection between the peripheral device and the host device, switching the peripheral device from a first mode into a second mode in response to the detected connection, and delaying sending a response to the data access message during a period in which the peripheral device switches from a first mode into a second mode.

Implementations can include one or more of the following features. The file system data can be retrieved by loading the file system data into a local cache. A process can be initiated to switch the peripheral device from a first mode into a second mode in response to the detected connection. The first mode is associated with playback of multimedia files selected from a group consisting of a music file, a video file, a picture file, and a document file on the peripheral device, and the second mode is associated with file transfer access between the peripheral device and the host device. The file system data can include data for enabling access to files stored on the storage media. Retrieving the file system data from the storage media can be performed concurrently with switching the peripheral device from the first mode into the second mode. The peripheral device can be selected from a group consisting of a peripheral disk drive device, a logical disk drive, a removable storage device, a portable device that includes a storage media, and a mass storage device. The file system data can include information for enabling access to data on the storage media such as directory data.

Implementations may also include one or more of the following features. Delaying the response to the data access message can include delaying sending the response until buffers are cleared in the peripheral device.

These aspects can be implemented using an apparatus, a method, a system, or any combination of an apparatus, methods, and systems. The details of one or more implementations are set forth in the accompanying drawings and the description below. Further features, aspects, and advantages will become apparent from the description, the drawings, and the claims.

BRIEF DESCRIPTION OF DRAWINGS

Like reference symbols in the various drawings indicate like elements.

DETAILED DESCRIPTION

The following describes techniques for reducing the mount time of a peripheral disk drive device or other mass storage class device in response to plugging in the peripheral device to an external host device. In the following description, for the purpose of explanation, numerous specific details are set forth to provide a thorough understanding of the present disclosure. It will be apparent, however, to one of ordinary skill in the art that the present disclosure may be practiced without these specific details. In other instances, well-known structures are shown in block diagram form to avoid unnecessarily obscuring the present disclosure.

Figure 1:
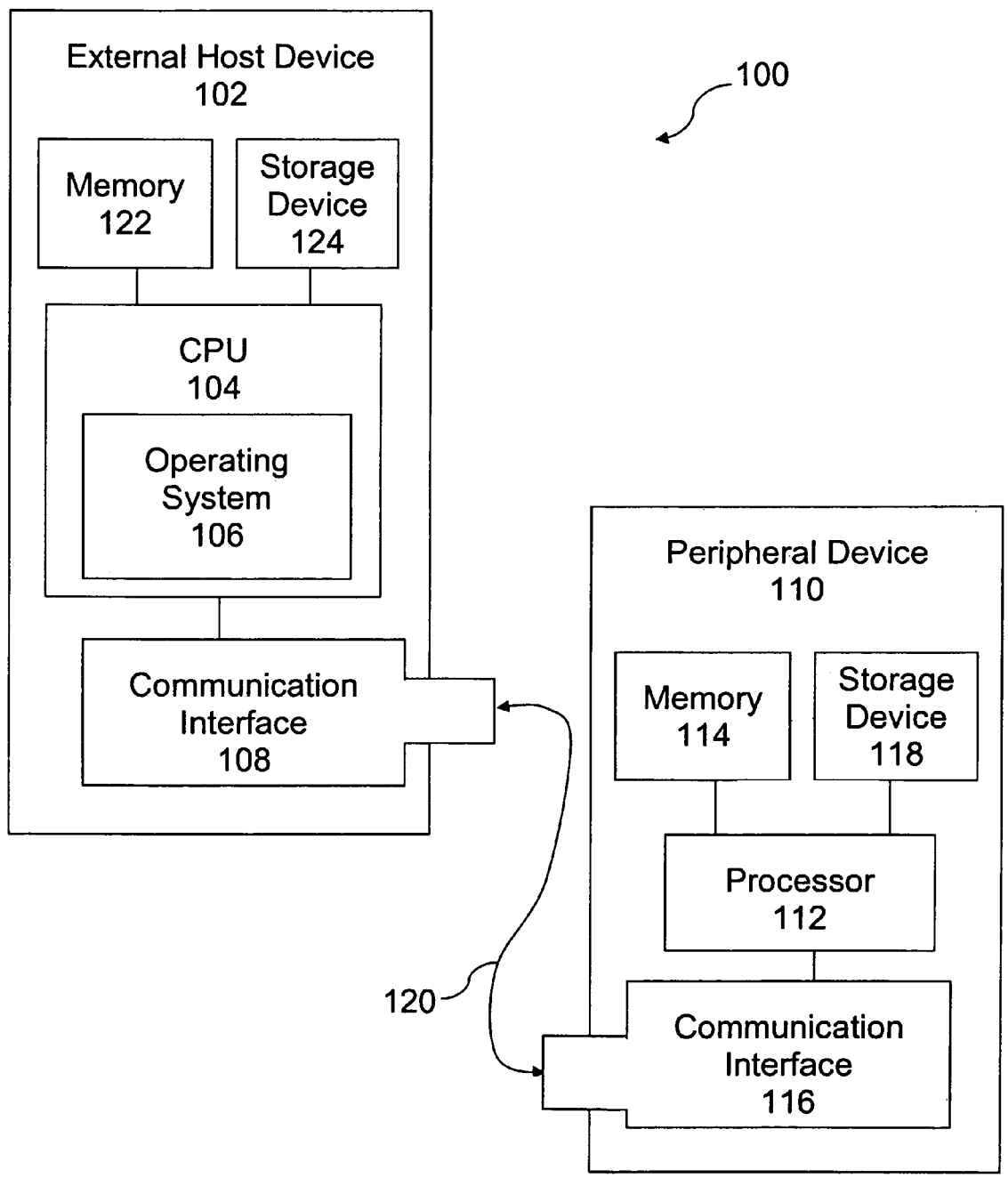
FIG. 1 is a block diagram of a peripheral device access system.

FIG. 1 is a block diagram of a peripheral device access system 100 according to one implementation of a technique for reducing mount time of a peripheral disk drive device or other mass storage class device. The peripheral device access system 100 includes at least a peripheral device 110 and an external host device 102. The peripheral device 110 may be a peripheral disk drive device, a logical disk drive device, a mass storage class device, or other removable and/or portable memory devices. The peripheral device 110 includes at least a processor 112, a memory 114, a storage device 118, and a communication interface 116. The memory 114 may include a volatile RAM-based memory devices such as RAM, DRAM, SDRAM, DDRAM, and other similar devices. The storage device 118 may include a non-volatile storage device such as ROM, Flash ROM, CompactFlash, and magnetic disk devices. The storage device 118 may also be portable and/or removable. The external host device 102 may be a personal computer, a laptop computer, or some other computing device. The external host device 102 may include at least a central processing unit (CPU) 104, an operating system 106, a communication interface 108, a memory 122 and a storage device 124. The memory 122 may include a volatile RAM-based memory devices such as RAM, DRAM, SDRAM, DDRAM, and other similar devices. The storage device 124 may include a non-volatile storage device such as ROM, CD-ROM, Flash ROM, CompactFlash, and magnetic disk devices. Other components not shown such as input/output devices may readily be implemented on either or both of the external host device 102 and the peripheral device 110.

The peripheral device 110 is connected to the external host device 102 through a communication link 120. The communication link 120 is a bi-directional communication link between the peripheral device 110 and the external host device 102. In some implementations, the communication link 120 is a physical cable or wire link compatible with typical data communication standards including IEEE 1394 (FireWire) connection, Universal Serial Bus (USB) connection, or other serial or parallel data connections. The communication link 120 typically physically connects to a communication interface 116 on the peripheral device 110 and a communication interface 108 on the external host device 102. The communication interfaces 108 and 116 on the external host device 102 and the peripheral device 110 are compatible with one of the data communication standards (e.g. FireWire or USB) mentioned above.

In some implementations, the peripheral device 110 is a mass storage class device such as a portable computing device dedicated to processing media such as audio, video, or images. For example, the peripheral device 110 may be a music player such as an MP3 player, a game player, a video player, a video recorder, a camera, an image viewer, an iPod™ available from Apple Computer of Cupertino, Calif., and the like. These devices are generally battery operated and highly portable so as to allow a user to listen to music, play games or video, record video, or take pictures wherever the user travels.

In some implementations, the peripheral device 110 may be a peripheral disk drive including an external hard disk drive. In yet other implementations, the peripheral device may be a logical disk drive including a flash memory device.

The peripheral device 110 may store various types of data in memory 114 and storage device 118. For example, one type of data stored can be user-selected data (e.g., media files). Media files can include various music, video, image, game, document, and other standard media files in various standard formats. Possible media file formats are described in detail below in description to FIG. 2 below. Media files may be accessed by the user while operating the peripheral device in a mode operative to execute playback of the media file. In addition, the peripheral device can also store metadata (e.g., directory information) to indicate organization of the user-selected files stored in the memory 114 or the storage device 118. The external host device 102 may need to access such information when transferring files between the peripheral device 110 and the external host device 102. Other types of data may also be stored in the peripheral device as appropriate or desired by the user and may depend on the type and specification of the peripheral device 110.

The peripheral device 110 may be connected to the external host device 102 to exchange files or other data between the devices. In implementations where the peripheral device 110 is a mass storage class device such as a portable music and/or video storage and playback device, the peripheral device 110 typically transitions between at least two modes of operation: (1) a music playback mode; and (2) a disk mode, in which music or other files can be transferred to or from the device. In this second mode of operation, access to the storage media is generally handled from the external host device 102. The device 110 can only be in one of these two modes of operation at a time to ensure that database synchronization is maintained. The device 110 may be periodically connected to the external host device 102 through the communication link 120, which causes the device 110 to switch from the music playback mode to the disk mode. When the device 110 is plugged into the external host device 102, a virtual "inject" message is generated, which causes the switch to the disk mode. When the device 110 is to be disconnected, a virtual "eject" instruction is sent to the device 110. For example, such an instruction can be generated when a disconnect command is requested by a user through an interaction with an external application program or with the operating system of the external host device 102.

Figure 2:
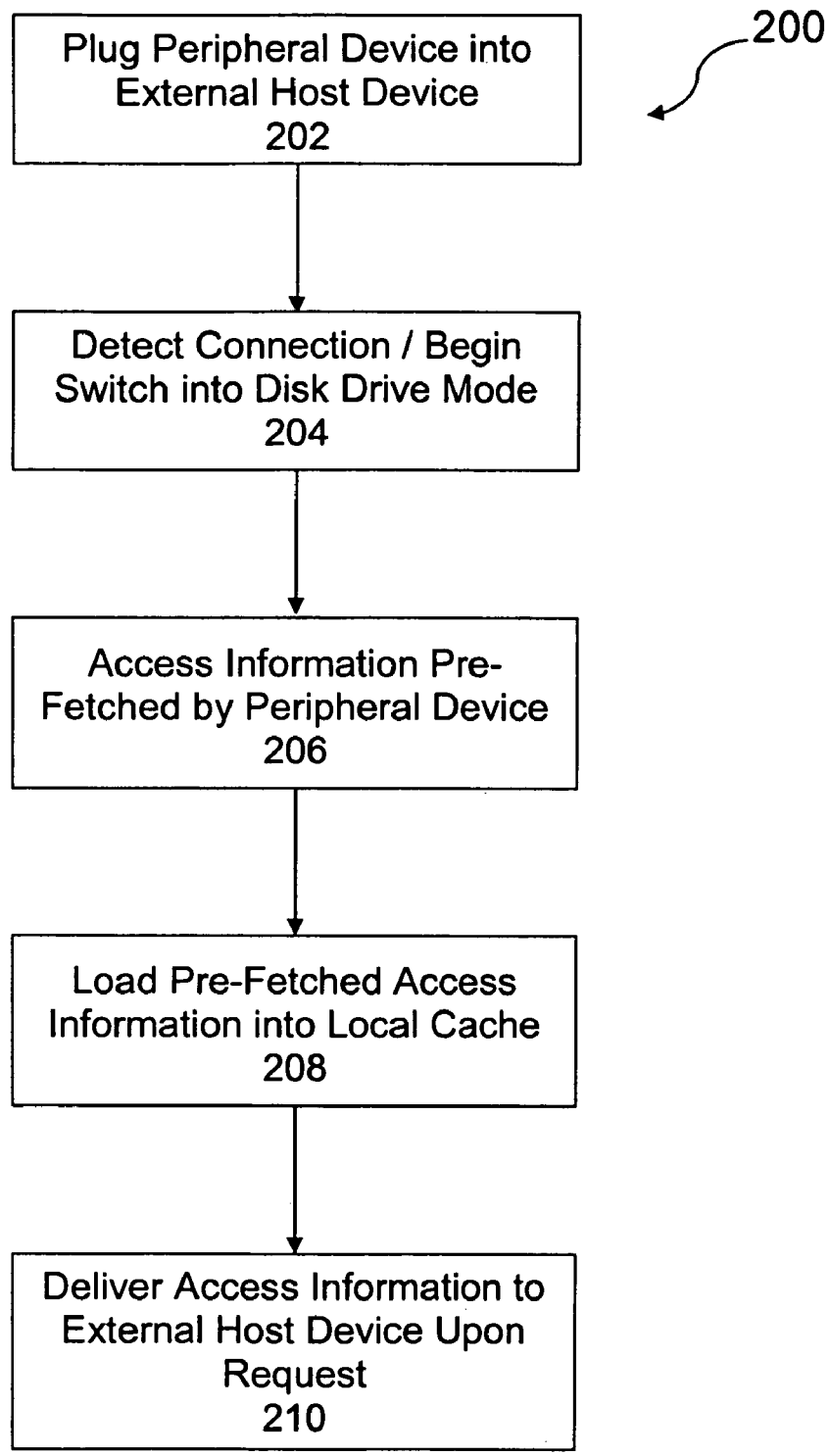
FIG. 2 is a flow chart depicting a process of reducing the access time for the external host device to access information from the peripheral device

FIG. 2 is a flow chart describing a process 200 of reducing mount time of the peripheral device 110 connecting to the external host device 102. This technique can be used to reduce the time needed for the external host device 102 to access information from the peripheral device 110 after detecting a connection between the two devices. The accessed information can include directory data or other information (e.g., "access information") used to enable or facilitate read access to files stored on or by the peripheral device 110, or write access to be able to store new files or data on or by the peripheral device 110. At step 202, the peripheral device 110 is "plugged" into the external device 102 to transfer files between the two devices. A connection may be accomplished by physically connecting the communication link 120 to the communication interface 108 of the external host device 102 and the communication interface 116 for the peripheral device 110. In some implementations, a connection may alternatively be accomplished using a wireless communication link (e.g., Bluetooth, infrared, or other wireless communication) between the external host and the peripheral device 110.

At step 204, the physical connection between the peripheral device 110 and the external host device 102 is detected. In response to the detected connection, a switch between modes is initiated. For example, in an implementation where the peripheral device 110 is a portable music playback device, when the connection is detected, the device 110 immediately begins a process of switching from a music player mode to a disk drive mode. This can be a lengthy process that involves stopping music play, clearing buffers on the device 110, and "spinning" the disk drive or the flash memory, either "virtually" or physically. For example, the "virtual spin-up" time can include other steps, in addition to stopping music play and clearing buffers, for preparing the device 110 to perform read and write actions.

At step 206, the peripheral device 110 pre-fetches access information into a memory device 114 such as a dynamic random access memory (DRAM) when the peripheral device 110 detects that it has been plugged into an external host device 102. This pre-fetching process may be performed during the time the peripheral device 110 transfers from music playing mode to disk mode. For example, a cache in the local memory 114 can be promptly cleared to make room for caching pre-fetched data.

In some implementations, the access information includes FAT partition information, such as the boot sector, boot block, and root directory for the Windows operating system. In other implementations, such as for the Apple operating system (Mac OS), the critical information includes hierarchical file system (HFS) information, such as the B tree, root directory, and volume header. Implementations can also include the use of access information from other disk file systems, such as New Technology File System (NTFS); second extended file system (ext2), which is a file system for the Linux kernel; ISO 9660, which defines a file system for CD-ROM media; and Universal Disk Format (UDF).

At step 208, the pre-fetched access information may be loaded into a local cache while the peripheral device 110 switches into a second mode of operation. For example, the peripheral device switches from a music playing mode into a disk drive mode. The music playing mode can be associated with playing or otherwise presenting multimedia files such as audio files, video files, and picture files. Audio files may include files compatible with MP3, WAV, RAM, RA, AAC, M4P, or any other format suitable for storing music. Video files may include files compatible with at least MPEG, WMV, WMA, AVI, MOV, QT, RM, RMVB, ASF, or any other format suitable for storing video. Picture files may include files compatible with TIF, JPG, GIF, PSD, BMP, PNG format, or any other format suitable for storing images. In alternative implementations, files other than multimedia files including text and document files may be accessed when the peripheral device is in a standalone or playback mode. The disk drive mode is associated with file transfer access between the peripheral device 110 and the external host device 102.

In some implementations, the peripheral device 110 has a large amount of memory (e.g., a cache) that is quite full when playing music, but that is virtually empty when copying music to/from the device 110; this memory can be used to store the pre-fetched information. The information loaded into the local cache can be quickly delivered to the external host device 102 when it requests the information at step 210. The information delivered to the external host device 102 can be loaded onto the storage device 124. This pre-fetching of information can reduce the time needed to activate the disk mode compared with waiting for the external host device 102 to request the information from the peripheral device 110 before retrieving the information from, for example, a flash memory.

In accordance with an additional or alternative feature, the time for connecting the peripheral device 110 to the external host device 102 can be further reduced. In accordance with the conventional operation of the Windows operating system, when a peripheral device 110 is plugged into the external host device 102 (e.g., using USB or FireWire connection), the external host device 102 immediately sends a data access command to the peripheral device 110. If the data access command fails (e.g., because the peripheral device 110 has not switched into the disk mode and is therefore not ready to respond or because the peripheral device 110 does not yet have information requested in the data access command), the peripheral device 110 sends, and the external host device 102 receives, a response that the peripheral device 110 is not ready to allow access to data. Upon receiving such a response, Windows immediately sends another data access command to the peripheral host device 110. If this second data access command also fails with the same failure message, Windows automatically pauses for approximately ten seconds before reattempting to establish communications. Typically, in the case of an iPod or other similar device, the second data access command fails because it takes about two and a half seconds for an iPod to transfer from the music mode to the disk mode, which includes stopping music play and clearing buffers before being ready to communicate with the external host device 102. Accordingly, because Windows sends two quick requests followed by a ten second delay, it generally takes at least ten seconds after detecting the peripheral device 110 being plugged into the external host device 102 before a successful response to a data access command can be obtained.

Figure 3:
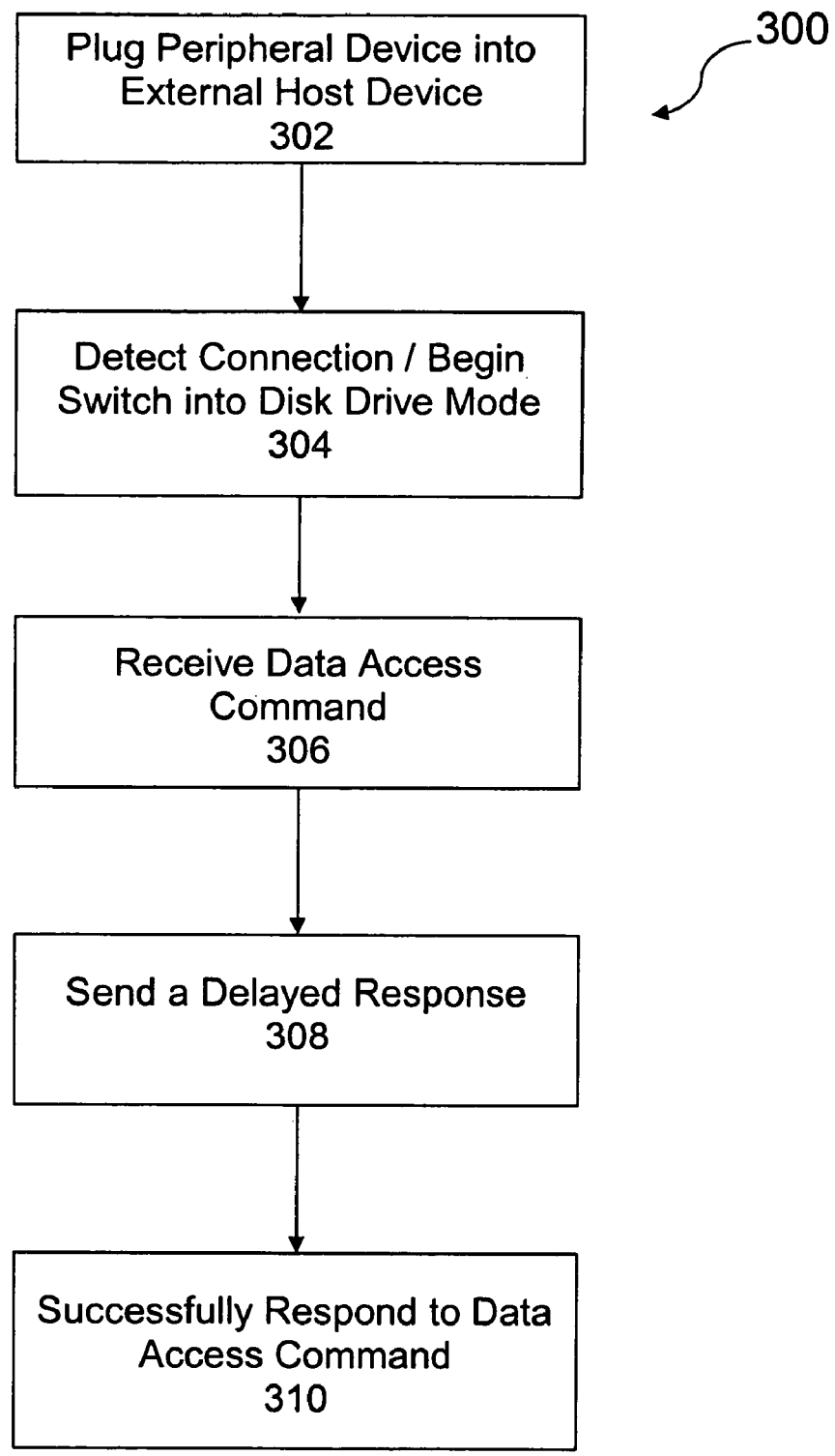
FIG. 3 is a flow chart depicting a process of reducing delays due to data access command failures.

FIG. 3 is a flow chart for reducing the mount time of a peripheral device 110 connecting to an external host device 102 by avoiding delays due to data access command failures. At step 302, the peripheral device 110 is "plugged" into the external device 102 (e.g., to transfer files between the two devices). At step 304, the external host device 102 and/or the peripheral device 110 detect that the peripheral device 110 has been plugged into the external host device 102. In response to the detection, the external host device 102 sends a data access command to the peripheral device 110 at step 306. At step 308, instead of responding that the requested data is unavailable, which after two consecutive such responses causes Windows to not send another request for about ten seconds, the peripheral device 110 delays sending a response to the request until it has cleared its buffers, switched modes, and is able to successfully respond to the data access command. This delay may take approximately two and half to four seconds, which is significantly shorter than delays caused by data access command failures. Thus, the peripheral device 110 can successfully respond to the data access command at step 310 while avoiding the longer delays caused by data access command failures. The delayed response is applicable not only for flash drives, which have a "virtual spin-up" time, but any type of disk drive that requires a "spin-up" time.

Some implementations use the process of pre-fetching access information to reduce time for the external host device 102 to access the information. Other implementations use the process of sending a delayed response to a data access command to reduce data access command failure delays. Yet other implementations use both processes to take advantage of both aspects of reducing the mount time.

Figure 4:
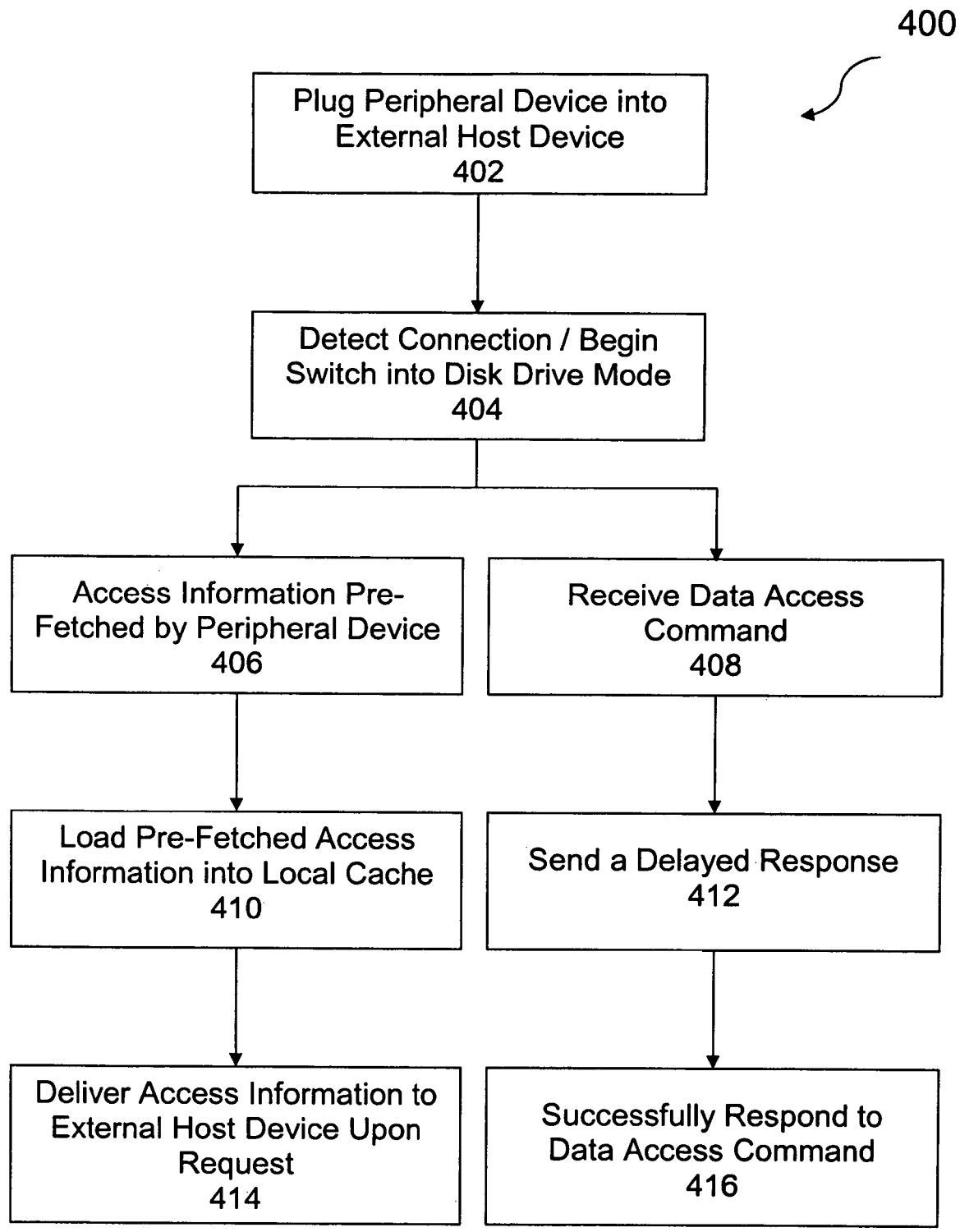
FIG. 4 is a flow chart depicting a process for reducing access time for retrieving information from the peripheral device to the external host device and for reducing delays due to data access command failures.

FIG. 4 is a flow chart for implementing both the process of reducing the time needed for the external host device 102 to access the information and the process of reducing data access command delays. Steps 402, 404, 406, 408, 410, 412, 414, and 416 correspond to equivalent steps described in FIGS. 2 and 3 above. At step 402, peripheral device 110 is plugged into the external host device 102. As described in connection with FIG. 2, a connection may be accomplished by providing a physical connection using the communication link 120, which includes a wired connection (e.g. USB or FireWire) or a wireless connection (e.g. BlueTooth or Infrared). The connection is detected at step 404 and the peripheral device 110 begins the transition from a first mode (e.g. music playback mode) into a second mode (disk mode). Then both processes as described in FIGS. 2 and 3 are implemented in parallel. Steps 406, 410, and 414 correspond to steps 206, 208 and 210 (described in FIG. 2) respectively, and steps 408, 412, and 416 correspond to steps 306, 308, and 310 (described in FIG. 3) respectively.

In some implementations, the techniques for reducing the mount time when plugging in the peripheral device 110 to the external host device 102 as described in FIGS. 2-4 may be implemented using one or more computer programs comprising computer executable code stored on a computer readable medium and executing on the peripheral device 110, the external host device 102, or both. The computer readable medium may include a hard disk drive, a flash memory device, a random access memory device such as DRAM and SDRAM, removable storage medium such as CD-ROM and DVD-ROM, a tape, a floppy disk, a CompactFlash memory card, a secure digital (SD) memory card, or some other storage device. In some implementations, the computer executable code may include multiple portions or modules, with each portion designed to perform a specific function described in connection with FIGS. 2 and 3 above. In some implementations, the techniques may be implemented using hardware such as a microprocessor, a microcontroller, an embedded microcontroller with internal memory, or an erasable programmable read only memory (EPROM) encoding computer executable instructions for performing the techniques described in connection with FIGS. 2-4. In other implementations, the techniques may be implemented using a combination of software and hardware.

Processors suitable for the execution of a computer program include, by way of example, both general and special purpose microprocessors, and any one or more processors of any kind of digital computer, including graphics processors, such as a GPU. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

A number of implementations of the disclosure has been described. Nevertheless, it will be understood that various modifications may be made without departing from the spirit and scope of the disclosure.

What is claimed is:

1. A method for establishing communications involving a peripheral device, the method comprising:
   establishing a connection between the peripheral device and a host device; and
   pre-fetching, at the peripheral device, file system data from one or more storage media accessible by the peripheral device into a memory of the peripheral device in response to the established connection, the file system data pre-fetched prior to receiving a request for the file system data from the host device, wherein the file system data is adapted for providing at least one of read access or write access to the one or more storage media.

2. The method of claim 1 wherein pre-fetching the file system data comprises loading the file system data into a local cache.

3. The method of claim 1 further comprising switching the peripheral device from a first mode into a second mode in response to the established connection, wherein the first mode is associated with playback of multimedia files selected from a group consisting of a music file, a video file, a picture file, and a document file on the peripheral device, and the second mode is associated with file transfer access between the peripheral device and the host device.

4. The method of claim 3 wherein the file system data comprises data for enabling access to files stored on the one or more storage media.

5. The method of claim 3 wherein pre-fetching the file system data from the one or more storage media is performed concurrently with switching the peripheral device from the first mode into the second mode.

6. The method of claim 1 wherein the peripheral device is selected from a group consisting of a peripheral disk drive device, a logical disk drive, a removable storage device, a portable device that includes a storage media, and a mass storage device.

7. The method of claim 1 wherein the file system data comprises information for enabling access to data on the one or more storage media.

8. The method of claim 7 wherein the file system data comprises directory data.

9. A method for establishing communications involving a peripheral device, the method comprising:
   establishing a connection between a peripheral device and a host device;
   receiving a data access message from the host device in response to establishing the connection between the peripheral device and the host device;
   switching the peripheral device from a first mode into a second mode in response to the established connection; and
   delaying sending, from the peripheral device, a response to the data access message until the peripheral device completes the switch from a first mode into a second mode.

10. The method of claim 9 wherein delaying sending the response to the data access message further comprises delaying sending the response until buffers are cleared in the peripheral device.

11. The method of claim 9 wherein the first mode is associated with playback of a media file selected from a group consisting of a music file, a video file, a picture file, a document file, and a multimedia file on the peripheral device, and the second mode is associated with file transfer access between the peripheral device and the host device.

12. The method of claim 9 wherein the peripheral device is selected from a group consisting of a peripheral disk drive device, a logical disk drive, a removable storage device, a portable device that includes a storage media, and a mass storage device.

13. The method of claim 9 further comprising:
pre-fetching, at the peripheral device, file system data from one or more storage devices accessible by the peripheral device into a memory of the peripheral device in response to the established connection, the file system data retrieved prior to receiving a request for the file system data from the host device, wherein the file system data is adapted for providing at least one of read or write access to the one or more storage devices.

14. The method of claim 13, wherein pre-fetching the file system data from the one or more storage device accessible by the peripheral device into the memory of the peripheral device in response to the established connection is performed in parallel with switching the peripheral device from the first mode into the second mode.

15. A machine readable storage medium storing instructions operable to cause data processing apparatus to:
establish a connection between a peripheral device and a host device; and
pre-fetch file system data from one or more storage media accessible by the peripheral device into a memory of the peripheral device in response to the established-connection, the file system data pre-fetched prior to receiving a request for the file system data from the host device, wherein the file system data is adapted for providing at least one of read or write access to the one or more storage media.

16. The machine readable storage medium of claim 15 wherein pre-fetching the file system data further comprises loading the file data into a local cache.

17. The machine readable storage medium of claim 15 wherein the instructions are further operable to switch the peripheral device from a first mode into a second mode in response to the established connection, wherein the first mode is associated with playback of multimedia files selected from a group consisting of a music file, a video file, a picture file, and a document file on the peripheral device, and the second mode is associated with file transfer access between the peripheral device and the host device.

18. The machine readable storage medium of claim 17 wherein the file system data comprises data for enabling access to files stored on the one or more storage media.

19. The machine readable storage medium of claim 17 wherein the instructions are further operable to concurrently pre-fetch the file system data from the one or more storage media and switch the peripheral device from the first mode into the second mode.

20. The machine readable storage medium of claim 15 wherein the peripheral device is selected from a group consisting of a peripheral disk drive device, a logical disk drive, a removable storage device, a portable device that includes a storage media, and a mass storage device.

21. A machine readable storage medium storing instructions operable to cause data processing apparatus to:
establish a connection between a peripheral device and a host device;
receive a data access message from a host device in response to establishing a connection between a peripheral device and a host device;
switch the peripheral device from a first mode into a second mode in response to the established connection; and
delay sending, from the peripheral device, a response to the data access message until the peripheral device completes the switch from a first mode into a second mode.

22. The machine readable storage medium of claim 21 wherein the instructions are further operable to cause data processing apparatus to delay sending the response to the data access command until buffers are cleared in the peripheral device.

23. The machine readable storage medium of claim 21 wherein the first mode enables playback of media files comprising at least one of a music file, a video file, a picture file, or a document file on the peripheral device, and the second mode comprises file transfer access between the peripheral device and the host device.

24. The machine readable storage medium of claim 21 wherein the peripheral device is selected from a group consisting of a peripheral disk drive device, a logical disk drive, a mass storage device, a removable storage device, and a portable device that includes a storage media.

25. The machine readable storage medium of claim 21 wherein the instructions are further operable to cause data processing apparatus to pre-fetch file system data from one or more storage media accessible by the peripheral device into a memory of the peripheral device in response to the established connection, the file system data pre-fetched prior to receiving a request for the file system data from the host device, and switch the peripheral device from the first mode into the second mode in parallel, wherein the file system data is adapted for providing at least one of read or write access to the one or more storage media.

26. A system for establishing communications involving a peripheral device, the system comprising:
a establishing means operable to establish a connection between a peripheral device and a host device;
a retrieval means operable to pre-fetch file system data from one or more storage media accessible by the peripheral device into a memory of the peripheral device in response to the established connection, the file system data pre-fetched prior to receiving a request for the file system data from the host device, wherein the file system data is adapted for providing at least one of read or write access to the one or more storage media;
a receiving means operable to receive a data access command from a host device in response to establishing a connection between a peripheral device and a host device;
a switching means operable to switch the peripheral device from a first mode into a second mode in response to the established connection; and
a delay means operable to delay sending, from the peripheral device, a response to the data access command until the peripheral device completes the switch from a first mode into a second mode.

27. The method of claim 1, wherein the file system data comprises at least one of hierarchical file system (HFS) data, new technology file system (NTFS) data, second extended file system (ext2) data or universal disk format (UDF).

28. The method of claim 13, wherein the file system data comprises at least one of hierarchical file system (HFS) data, new technology file system (NTFS) data, second extended file system (ext2) data or universal disk format (UDF).

29. The machine readable storage medium of claim 15, wherein the file system data comprises at least one of hierarchical file system (HFS) data, new technology file system (NTFS) data, second extended file system (ext2) data or universal disk format (UDF).

30. The machine readable storage medium of claim 25, wherein the file system data comprises at least one of hierarchical file system (HFS) data, new technology file system (NTFS) data, second extended file system (ext2) data or universal disk format (UDF).

31. The system of claim 26, wherein the file system data comprises at least one of hierarchical file system (HFS) data, new technology file system (NTFS) data, second extended file system (ext2) data or universal disk format (UDF).

32. The method of claim 9, wherein the data access message from the host device indicates a request for the host device to have read or write access to data stored by the peripheral device; and wherein the peripheral device is not configured to provide the host device with read or write access to the data when operating in the first mode, and wherein the peripheral device is configured to provide the host device with read or write access to the data when operating in the second mode.

33. The machine readable storage medium of claim 21, wherein the data access message from the host device indicates a request for the host device to have read or write access to data stored by the peripheral device; and wherein the peripheral device is not configured to provide the host device with read or write access to the data when operating in the first mode, and wherein the peripheral device is configured to provide the host device with read or write access to the data when operating in the second mode.

34. The system of claim 26, wherein the data access message from the host device indicates a request for the host device to have read or write access to data stored by the peripheral device; and wherein the peripheral device is not configured to provide the host device with read or write access to the data when operating in the first mode, and wherein the peripheral device is configured to provide the host device with read or write access to the data when operating in the second mode.

* * * * *

UNITED STATES PATENT AND TRADEMARK OFFICE
CERTIFICATE OF CORRECTION

| | | |
|---|---|---|
| PATENT NO. | : 7,912,994 B2 | Page 1 of 1 |
| APPLICATION NO. | : 11/342126 | |
| DATED | : March 22, 2011 | |
| INVENTOR(S) | : Michael J. Cornwell et al. | |

It is certified that error appears in the above-identified patent and that said Letters Patent is hereby corrected as shown below:

In column 2, line 42, delete "device" and insert -- device. --, therefor.

In column 9, line 23-24, delete "established-connection," and insert -- established connection, --, therefor.

Signed and Sealed this
Twenty-ninth Day of November, 2011

David J. Kappos
*Director of the United States Patent and Trademark Office*